United States Patent [19]

Robertson et al.

[11] 3,961,149
[45] June 1, 1976

[54] APPARATUS FOR APPLICATION OF BEARING MATERIAL

[75] Inventors: John M. Robertson, Northville, Mich.; Wilbur E. Wyatt, Greensburg, Ind.

[73] Assignee: Gulf & Western Metals Forming Company, Southfield, Mich.

[22] Filed: Sept. 21, 1973

[21] Appl. No.: 399,392

Related U.S. Application Data

[63] Continuation-in-part of Ser. No. 174,885, Aug. 25, 1971, Pat. No. 3,786,555.

[52] U.S. Cl. .................................. 219/9.5; 29/523; 228/44.1 R; 228/131; 228/243; 29/251
[51] Int. Cl.² .......................................... B23K 13/00
[58] Field of Search ........................ 228/6, 44, 49; 29/474.3, 474.4, 479, 481, 497.5, 504, 523, 251; 269/50, 52; 219/9.5, 10.53, 10.57, 10.73; 72/358, 359

[56] References Cited
UNITED STATES PATENTS

| | | | |
|---|---|---|---|
| 3,122,866 | 3/1964 | Gross | 269/52 X |
| 3,156,042 | 11/1964 | Reed | 29/497.5 X |
| 3,241,226 | 3/1966 | Jorgji | 29/523 X |
| 3,247,591 | 4/1966 | Panseri | 29/497.5 X |
| 3,383,454 | 5/1968 | Dix | 228/44 X |
| 3,386,161 | 6/1968 | Ruf | 29/504 X |
| 3,445,908 | 5/1969 | Straub | 29/523 X |
| 3,571,907 | 3/1971 | Watson | 29/479 X |

*Primary Examiner*—Ronald J. Shore
*Attorney, Agent, or Firm*—Whittemore, Hulbert & Belknap

[57] ABSTRACT

Bearing material, such as an aluminum alloy, is applied and bonded to the support surface by heating the surface to 500 to 700 degrees Fahrenheit, applying the bearing material in sheet form to the surface at one edge thereof, and spreading the material across the surface by moving a zone of pressure application to the bearing material from one edge of the surface to an opposed edge so as to reduce the thickness of the bearing material and to provide a flow which continually brings fresh previously unexposed bearing material from the interior of the sheet so as to effect a molecular bond. Typical applications are to sleeve type bearings or bushings, and a preferred use of the invention is the application of bearing material to connecting rods.

18 Claims, 11 Drawing Figures

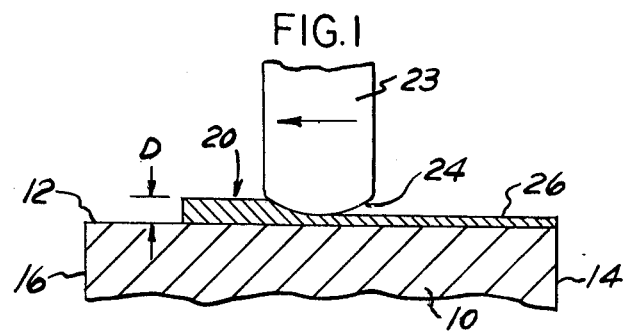
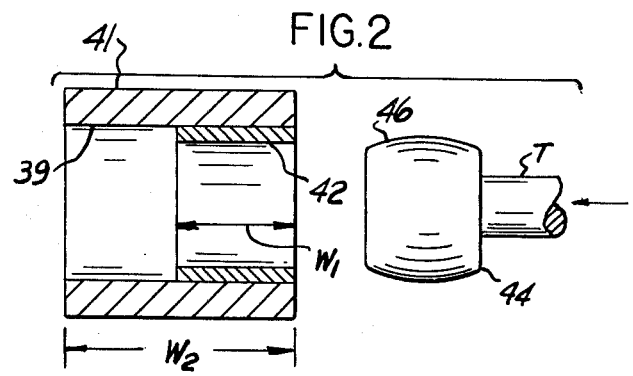
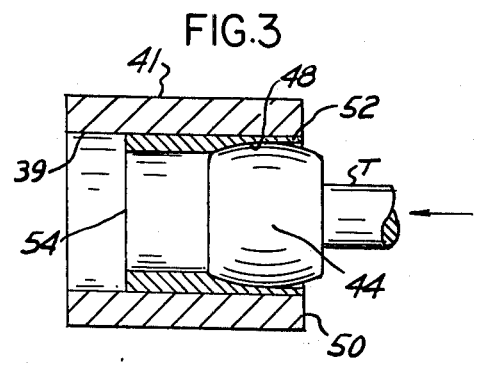
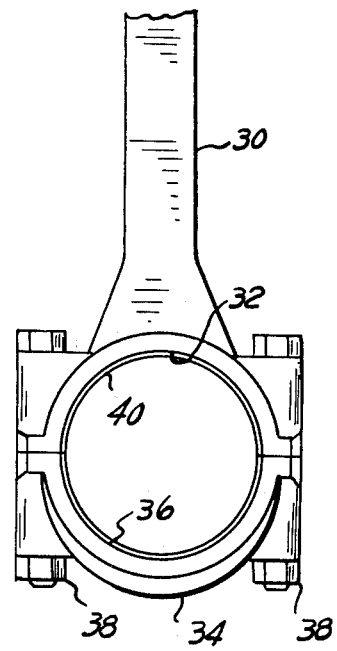
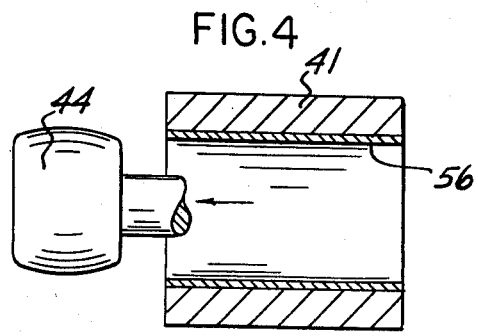
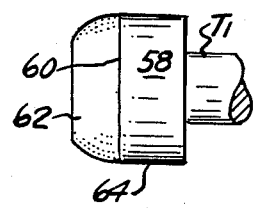

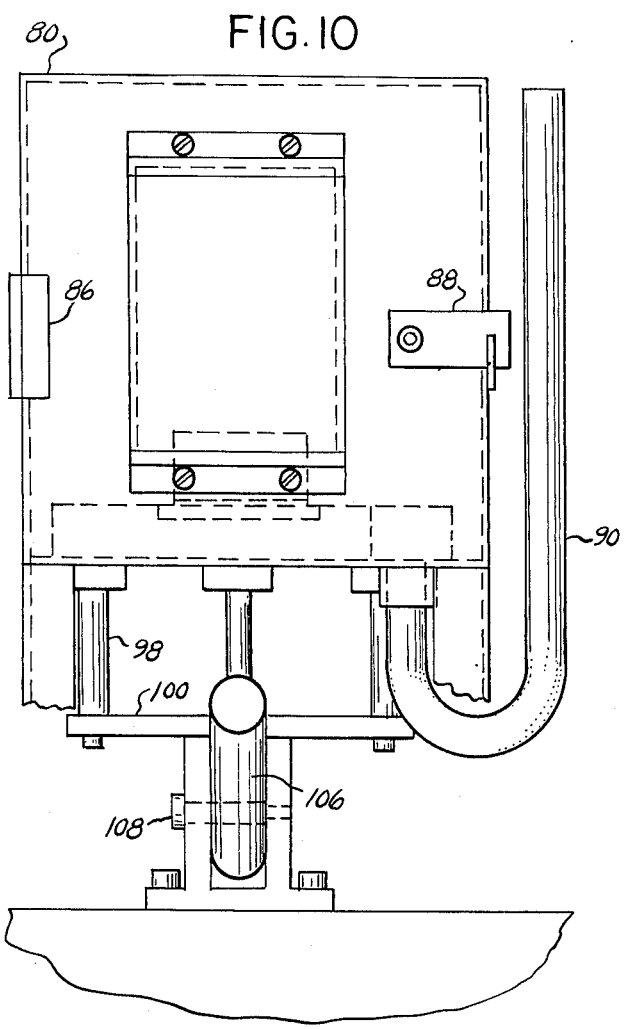
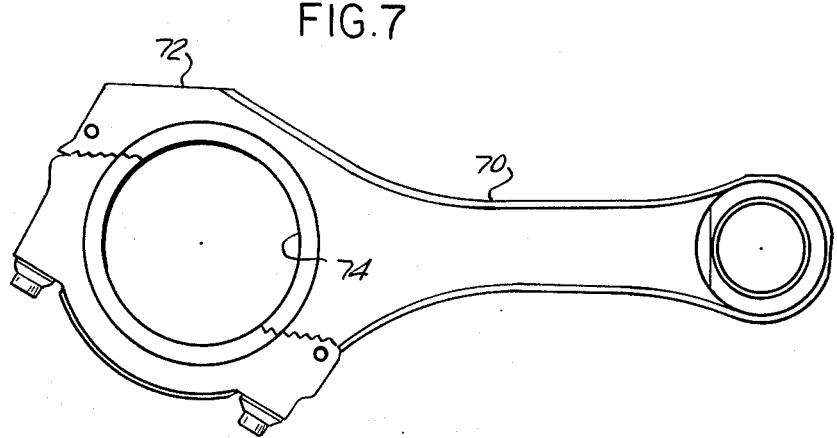

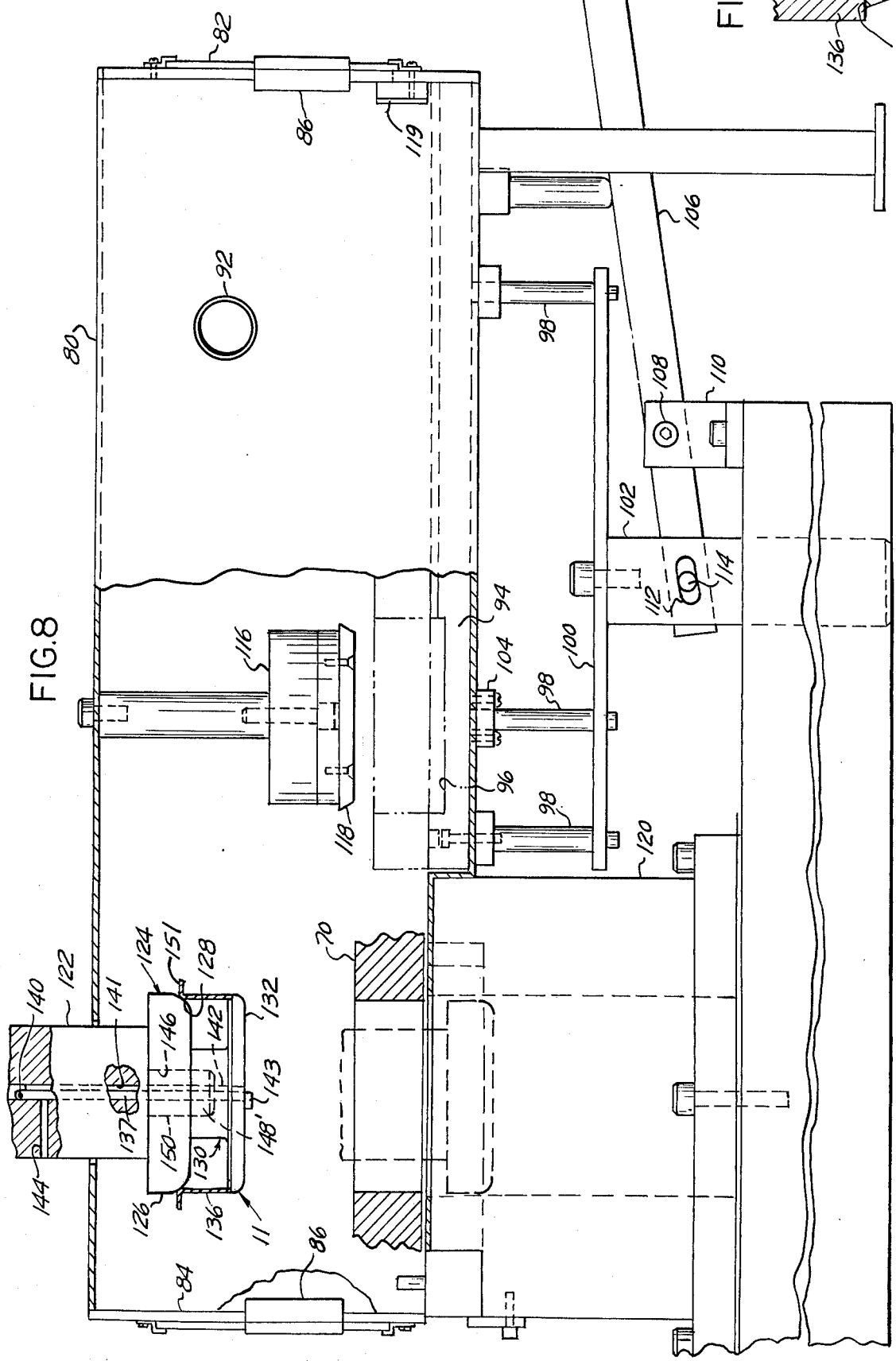

APPARATUS FOR APPLICATION OF BEARING MATERIAL

CROSS-REFERENCE TO RELATED APPLICATION

The present application is a continuation-in-part of our prior copending application Ser. No. 174,885, filed Aug. 25, 1971, now U.S. Pat. No. 3,786,555.

BRIEF SUMMARY OF THE INVENTION

The present invention relates to the application and bonding of bearing material to a support surface, and in its broadest aspect, the support surface may be flat, concave or convex. However, a preferred use of the present invention is the application and bonding of an aluminum alloy bearing to the big end of connecting rods and this use of the invention will be described in detail.

In the past a babbitt bearing material was cast in the cylindrical cavity in connecting rods, after which it was machined to the required configuration. This practice was replaced by the use of bearing shells in which an aluminum alloy was bonded to steel strips which were then cut and formed to required configuration and employed in the connecting rod assembly.

The present invention involves the application and bonding of aluminum alloy bearing material directly to the interior concave generally cylindrical surface at the big end of a connecting rod.

The problem of effecting a satisfactory bond between an aluminum alloy bearing and a support surface has been rendered difficult by the fact that aluminum oxide was invariably present on the surface of the bearing material and this interferred with the establishment of a satisfactory molecular bond.

In accordance with the present invention the bearing material is applied to the support surface, which will previously have been heated to a temperature between 500 and 700 degrees Fahrenheit. The bearing material is in sheet form and has a thickness substantially greater than the desired thickness of the bearing material as finally applied and bonded to the support surface. The bearing material is provided in sheet form having a width as measured from one end proportioned to the relationship between an initial thickness of the bearing material and the desired final thickness thereof. Typically, the material may be initially provided in sheet form having a thickness substantially twice the desired final thickness of the bearing material. In this case, the width of the bearing material will be approximately one-half the width of the support surface to which it is to be applied. The bearing material is brought into registration with the support surface so as to overlie a portion of the surface and to have one edge of the bearing material substantially coincident with a corresponding edge of the support surface.

The application and bonding of the bearing material to the surface is accomplished by establishing a limited zone of pressure, in which the pressure in the zone increases to a maximum and at its maximum is effective to reduce the thickness of the bearing material to the final desired thickness or somewhat in excess if final machining is to take place. This zone of pressure application is caused to move progressively across the support surface and will have the effect of causing a stretching and flow of bearing material at the surface thereof adjacent the support surface. This will result in providing fresh unoxidized alloy at the zone of maximum pressure application for efficient bonding. Thus, the progression of the zone of pressure application spreads the bearing material across the support surface to which it becomes metallurgically or molecularly bonded by the application of pressure at elevated temperature, the bond being particularly effective because it is produced between the support surface and fresh unoxidized bearing alloy.

In a preferred practice of the present invention the bearing material is applied to the inner surface of the big end of a connecting rod and the bearing material is initially applied in the form of a tube to the interior of the connecting rod. Pressure is applied by traversing a tool of circular cross-section having a peripheral surface rounded in cross-section adapted to expand the tube of bearing material, reduce its thickness, and elongate the material with accompanying stretching of its inner surface and flow of material so as to in effect spread the material across the support surface. The tool is moved through the bearing at moderate speed. The speed of advance of the tool is not particularly critical, but the application stroke may be completed in one second or less.

BRIEF DESCRIPTION OF THE DRAWINGS

FIG. 1 is an enlarged diagrammatic view illustrating the coaction between the tool, the sheet of bearing material, and the support surface.

FIG. 2 is an exploded diagrammatic view showing the initial application of tubular bearing material and the tool for completing application thereof.

FIGS. 3 and 4 are views similar to FIG. 2 illustrating conditions existing during traverse of the tool through the bearing.

FIG. 5 is a fragmentary elevational view of the large end of a connecting rod with bearing material applied thereto.

FIG. 6 is a fragmentary view of a modified tool.

FIG. 7 is an elevational view of the connecting rod.

FIG. 8 is a front elevational view of the apparatus for applying the bearing material.

FIG. 10 is a side elevational view of the apparatus seen in FIG. 8.

FIG. 11 is an enlargement, in section, of a detail designated by arrow 11, FIG. 8.

DETAILED DESCRIPTION

Figure 9:
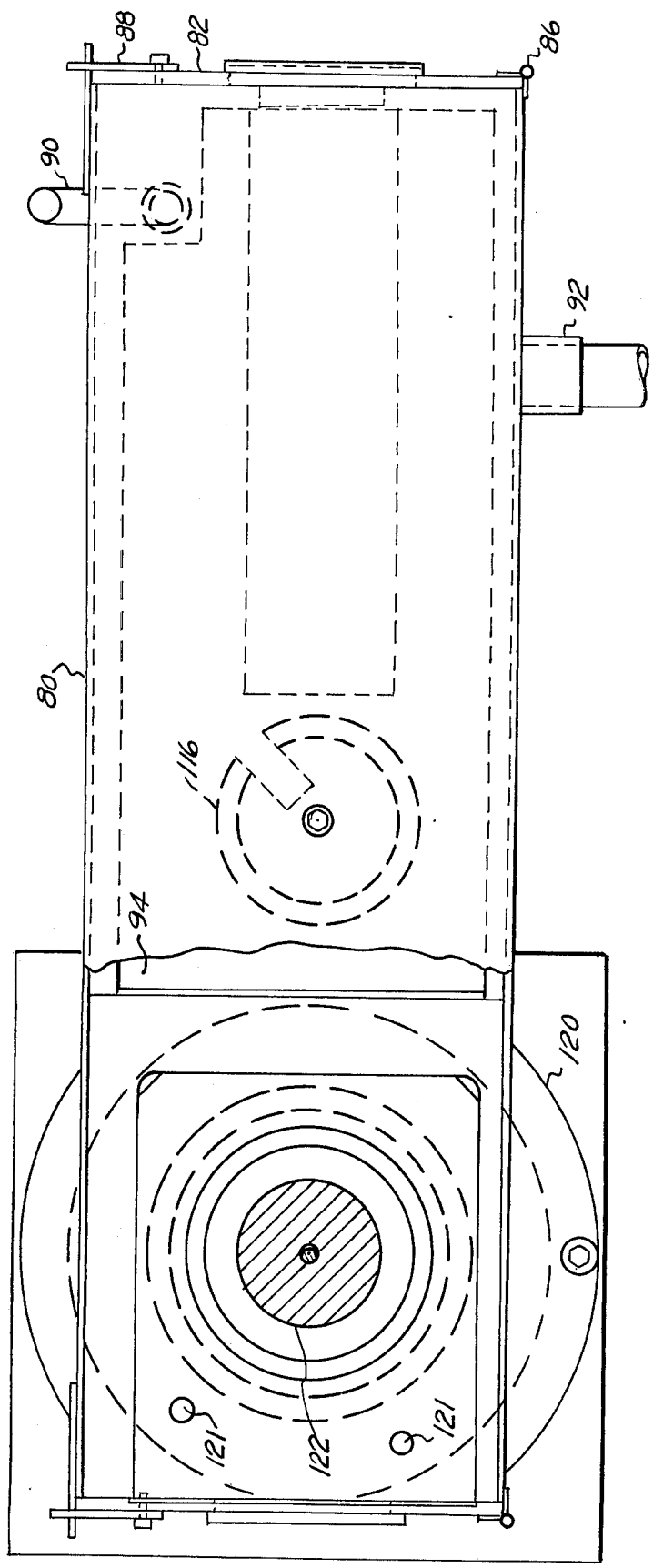
FIG. 9 is a plan view of the apparatus seen in FIG. 8.

The present invention provides an effective metallurgical or molecular bond between an aluminum alloy bearing material and a metallic support surface. The problem of obtaining a bond between a largely aluminum alloy and a metal support surface has presented severe difficulties because of the presence of oxides and particularly, aluminum oxide, at the surface of the bearing material which is to be bonded to the support surface.

In accordance with the present invention the support body, and hence its support surface, is brought to an elevated temperature as for example 500° to 700° Fahrenheit, and the bearing material is provided in sheet form with a thickness substantially greater than the desired thickness after application, and in a correspondingly reduced transverse dimension to provide for elongation of the bearing material as a result of reduction in its thickness.

As best illustrated in FIG. 1, the support body 10 has a bearing support surface 12 extending from one edge 14 to the opposite edge 16. The bearing material, indicated at 20, is provided in sheet form and has an initial thickness as indicated by the dimension D. The bearing material is positioned with one edge thereof in substantial registration with the edge 14 of the support body and its initial width, assuming its initial thickness to be about double the final desired thickness, will be approximately one-half the width of the support body between its edges 14 and 16.

With the bearing material in contact with or directly adjacent the support surface 12, a forming tool 23 is moved transversely across the support body in the direction of the arrow shown in the Figure. The forming tool has an edge or peripheral surface 24, at least the leading portion of which in transverse cross-section is curved as illustrated. The curvature of this advancing edge of the tool is critical since it applies a progressively increasing pressure to the bearing material, reduces its thickness, and causes the portion of the bearing material ahead of the tool to be advanced across the support surface so that fresh unoxidized bearing material is continually exposed at the zone of maximum pressure application, where the metallurgical or molecular bond is established. It has been found that the transverse curvature of the tool should have an approximate radius of curvature between 1 and 4 inches.

In the diagrammatic illustration of FIG. 1 the bearing material is indicated at 26, has a thickness which may be approximately half of its initial thickness and it is permanently bonded to the support surface 12.

While in the illustration of FIG. 1 the support surface 12 may be flat and the bearing material 20 may be provided in the form of a flat sheet, the invention is particularly advantageous in applying bearing material as a sleeve bearing or bushing to the interior of a cylindrical support surface. In a particular embodiment of the invention the application may be to the cylindrical support surface provided at the big end of a connecting rod and the bearing material after application and bonding to the connecting rod support surfaces, may be skived or otherwise separated along the abutting surfaces between the concave end of the connecting rod and the removable cap.

Referring now to FIG. 5 there is shown a connecting rod 30 having a concave cylindrical bearing support surface 32 and a removable cap 34 having a concave cylindrical bearing support surface 36. The connecting rod proper and the cap are assembled together by assembly bolts 38 leaving a cylindrical bearing support surface which is indicated at 39 in FIGS. 2–4 composed of the surfaces 32 and 36. In FIG. 5 the bearing material is indicated at 40.

In FIGS. 2–4 the bearing support body is designated 41. In FIG. 2 the bearing support surface 39 receives a tubular body 42 formed of bearing material. In this illustrative embodiment of the invention, it is assumed that the body 42 of bearing material has an initial thickness of about twice that desired to be applied and bonded to the support surface. Accordingly, the tubular body 42 has a length or width designated $W_1$ in FIG. 2, which is approximately half the width or transverse dimension $W_2$ of the bearing support body. Accordingly, as an operation takes place which reduces the thickness of the bearing material to approximately half its initial thickness, the length or width thereof is approximately doubled and it is thereby elongated to conform to the width $W_2$ of the support body. In this Figure a tool T is illustrated having a head 44 at least the advancing peripheral portion 46 of which is curved in transverse cross-section as illustrated. Conveniently, the curvature of the head may be arcuate in cross-section and the approximate radius of curvature will be between 1 and 4 inches in order to control the flow and displacement of material as the tool is advanced through the assembly of the bearing support and tubular body of bearing material.

In FIG. 3 the condition is illustrated in which the tool T has been advanced partially into the bearing support body 41 and the major diameter of the tool T as designated at 48, has advanced beyond the edge 50 of the body. Accordingly, the bearing material at 52 adjacent the edge 50 of the body has been reduced in thickness and the opposite edge of the bearing material, here designated 54, has advanced to the left from the initial position thereof illustrated in FIG. 2. Throughout the zone of pressure application which commences adjacent the leading edge of the tool head 44, the pressure increases to the zone determined by the maximum diameter of the head, here designated 48, and has the effect of spreading the bearing material across the surface of the support body, stretching and producing a flow of material at the outer surface of the bearing material. Due to the heated condition of the support body and the application of pressure, a permanent metallurgical or molecular bond is established between the bearing material and the support surface of the body 41.

In FIG. 4 the tool head 44 is illustrated as having passed beyond the edge of the support body 41 and the bearing material, here designated 56, is of uniform thickness and extends from edge to edge of the support body.

Referring to FIG. 6 there is illustrated a modified tool $T_1$ in which the leading end of the head, here designated 58, is convexly curved in transverse cross-section up to a zone indicated at 60 which is the initial zone of maximum diameter. Conveniently, the surface 62 of the pressure applying zone may be arcuate in transverse cross-section and will have a radius of curvature between 1 and 4 inches. The trailing end of the head 58 is cylindrical as indicated at 64 and this surface engages the inner surface of the bearing material as it has been shaped and pressure bonded by the leading peripheral portion of the head. This cylindrical surface on the head serves to stabilize the head and to insure true concentricity of the inner surface of the bearing and uniform thickness of the deposit of bearing material.

Successful practice of the present invention requires control of the smoothness of the bearing support surface and the angularity taper, or approximate arc of curvature of the pressure applying surface of the tool.

In order for the bearing material to be advanced ahead of the tool as it is reduced in thickness in such a way as to continually provide fresh unoxidized bearing material for bonding the bearing support surface, the bearing support surface must be quite smooth and should not substantially exceed a 100 microinch rms finish.

It will be understood that the bearing metal in the zone of pressure application is acted on by forces tending to push the metal ahead of the tool and also, due to the shape and inclination of the leading edge of the tool, to apply substantially radial forces which are effective to produce the bonding.

Due to the smoothness of the bearing support surface, the bearing material is moved by the tool in such a way that the surface in contact with the bearing support surface is stretched and elongated and caused to slide along the bearing support surface so as to continuously expose fresh unoxidized bearing material to the bearing support surface ahead of the zone of maximum pressure as determined by the minimum spacing between the peripheral surface of the tool and the bearing material. Thus, commencing right at the edge of the bearing support surface, an effective molecular or metallurgical bond is formed which extends uniformly and continuously to the opposite edge.

In some cases the bearing material may be provided with an initial thickness and applied with a tool such that the bearing material requires subsequent machining. However, by careful control of the bearing support body, it is possible to produce bearings by the passage of the tooth therethrough as disclosed herein, which require no subsequent machining.

In some cases it is desirable to nickel plate the bearing support surface prior to the application of the bearing material thereto. It may also be desirable in some cases to provide a plated surface on the bearing material after application to the bearing support body, such for example as a lead-tin plate.

While the operation is normally carried out by advancing the tool without rotation through the bearing assembly, under certain circumstances rotation of the tool may be provided.

In a specific practice of the present invention tubular bearing material having a wall thickness of approximately 0.040 inch was provided, the tube being dimensioned to fit closely within the cylindrical support surface of an assembled big end of a connecting rod.

The internal diameter of the bearing support surface was approximately 4 inches. The tool head had its periphery arcuately curved in transverse cross-section to a radius of 1 inch and the maximum diameter of the tool head was such as to reduce the thickness of the bearing material to approximately 0.020 inch.

The connecting rod was preheated to a temperature of 500° - 700° Fahrenheit and the tubular body of bearing material was inserted into the bearing support body so as to have one edge in registration with an edge of the bearing support surface. The bearing material in this case was S.A.E. 780 and the tool was advanced through the bearing to reduce the thickness of the bearing material to approximately 0.020 inch in a stroke completed in approximately 1 second.

APPLICATION OF BEARING MATERIAL TO BIG END OF CONNECTING ROD

A particularly useful application of the present invention is in providing bearing material in the cylindrical opening at the big end of a connecting rod. The connecting rod 70 as illustrated in FIG. 7, has a large end 72 with an opening 74 therein which is to be provided with a bushing by the application of bearing material to the internal cylindrical surface and the bonding of the bearing material to such surface.

In order to carry out this operation in an efficient manner, the apparatus illustrated in FIGS. 8, 9 and 10 is provided.

Described in general terms without reference to the drawings, the apparatus comprises an enclosure in which the connecting rod and the sleeve of bearing material which is to be applied to the connecting rod are contained in an inert or preferably in a reducing atmosphere to eliminate oxidation of the bearing material which is largely aluminum. The surface of the connecting rod to which the bearing material is to be applied is quickly heated to an elevated temperature, approximately 1000° F. by elevating the connecting rod on a support to cause the opening in its big end to surround an induction heater. The bearing sleeve is not separately heated but is supported in a position adjacent the station at which the material is applied to the opening in the connecting rod. After the interior surface of the opening in the connecting rod is heated, the rod is quickly advanced to the aforesaid station and a ram moves the sleeve of bearing material into the heated opening. The sleeve of bearing material is relatively thin and is quickly heated to a temperature approximating that of the connecting rod and in being heated the sleeve expands so that it is received tightly within the opening in the connecting rod. Thereafter, a ram having an annular surface of arcuate cross-section merging into a cylindrical surface, is advanced through the sleeve, expanding it tightly into pressure contact with the heated surface in the connecting rod, and spreading the material of the sleeve so as to expose fresh unoxidized bearing material which contacts with the heated surface of the connecting rod and forms firm permanent molecular bond.

Referring now in detail to FIGS. 8, 9 and 10, the apparatus comprises an enclosed elongated housing 80 having doors 82 and 84 at opposite ends which are hinged to the housing as indicated at 86. Suitable latch means indicated at 88 are provided. The interior of the housing 80 is maintained with a reducing atmosphere by introducing gas throughout the inlet connection 90, the housing being provided with an outlet connection as indicated at 92.

Within the housing 80 is a platform 94 onto which a connecting rod may be placed with its big end received and approximately located in a cylindrical well or recess 96 provided in the platform. The platform is movable vertically and is connected by supports 98 to an actuating plate 100 having a depending strut 102 connected thereto. The supports 98 are movable through guide bushings 104 secured to the underside of the housing 80. Vertical movement of the platform 94 is accomplished by a lever 106 which is pivoted as indicated at 108 to a mounting bracket 110, the lever having an elongated slot 112 which receives a pin 114 projecting from the strut 102. Accordingly, as the lever 106 is pivoted the platform 94 is moved vertically.

Located within the housing 80 is an induction heater indicated diagrammatically at 116 and which has secured to its underside a locating plate 118 the peripheral surface of which is beveled to cooperate with the opening in the big end of the connecting rod so as to guide the connecting rod as it is moved upwardly into a position in which the induction heater is located within the opening in the big end of the connecting rod. Electric current is supplied to the induction heater for a period sufficient to bring the material at the inner surface of the hole in the connecting rod to approximately 1000° F. This is accomplished in a few seconds. Thereafter, the platform 94 is lowered and the connecting rod is advanced to the station at which the bearing material is applied, preferably by means of a pusher introduced through a hole in door 82 normally closed by a pivoted plate 119. The portion of the connecting rod having the hole to which the bearing material is to be applied is supported on a heavy annular anvil 120 and the connecting rod is accurately located by engagement with the engagement of its big end with locating stops indicated at 121, FIG. 9.

A sleeve of bearing material has previously been applied to the structure for inserting and applying the bearing material to the hole in the big end of the connecting rod. The structure comprises a ram 122 carrying at its lower end an applicator tool 124. The tool is of circular shape and in radial cross-section its periphery includes an upper cylindrical portion 126 and a lower arcuately curved portion 128, the two merging smoothly as illustrated in FIG. 8. In other words, the arcuate surface 128 is tangent to the cylindrical surface 126.

Suspended beneath the applicator tool is a sleeve support member 130 having a circular support portion 132 provided at its upper peripheral corner with a circular notch or recess as best seen in FIG. 11, providing a shallow shoulder 134 dimensioned to receive the lower end of the sleeve of bearing material which is here designated 136. The support member 130 is connected to the ram 122 by a releasable trigger 137 which is pivoted as indicated at 140 in an enlarged opening 141 in the ram. The trigger 137 is laterally movable within an enlarged opening 142 in the support member 130 and has a head 143 which is movable between a holding position in which it engages the underside of the support member 130 and a release position in which the head is in alignment with the opening 142, which permits the support member 130 and tool 124 to be disconnected from the ram 122.

A laterally extending opening 144 communicates with the opening 141 and by insertion of a tool through the opening, the trigger 137 may be swung to release position.

Tool 124 has a cylindrical opening 146 therethrough, and a cylindrical recess 148 is provided at the upper part of support member 130. The ram 122 is provided with a locating projection 150 which fits within the opening and recess as shown in FIG. 8.

When the connecting rod, with its internal surface heated as aforesaid, and while the temperature thereof remains above 800° F., the ram is lowered and the sleeve of bearing material is inserted into the hole in the connecting rod. The dimensions of the sleeve are such that it enters freely into the opening in the connecting rod until its downward movement is arrested by engagement of a flange 151 with the upper surface of the connecting rod. The sleeve is retained in this position for a short interval, is heated from the hot surface of the opening through the connecting rod, and expands into tight contact with the surface of the opening.

Thereafter, downward movement of the ram results in a reduction in thickness of the bearing material so that the material is caused to spread ahead of the tool 124, thus exposing fresh unoxidized bearing material directly at the surface to which it is to be bonded. At the same time, since the arcuate shape 128 of the tool merges into the cylindrical surface 126 thereof, the radial pressure applied through the tool to the bearing material and the surface of the hole in the connecting rod increases to extremely high values. Due to the extremely high pressure, the presence of fresh unoxidized bearing material, and the fact that the surface of the connecting rod as well as the sleeve of bearing material at this time are at an elevated temperature, for example about 800° F., application of the bearing material to the support surface of the connecting rod is provided in such a way as to ensure a permanent metallurgical bond.

After the tool 124 has passed completely through the hole in the connecting rod and occupies the opening within the annular anvil 120, a tool is inserted through the opening 144 in the ram, rocking the head of the trigger 137 into registration with the opening 142, thus permitting the support member 130 and the applicator tool 124 to separate from the ram 122. This permits the ram to be elevated to clear all portions connected thereto from the connecting rod so that the connecting rod may be removed through the exit door 84.

OPERATION

The complete operation in applying the aluminum alloy bearing material to the hole in the big end of the connecting rod will now be reviewed.

The hole in the big end of the connecting rod is bored to a dimension taking into account the thickness of bearing material and other factors as will be described. Thereafter, the interior surface of the hole is shot blasted to provide a surface effective to bring about the required metallurgical bonding of component materials of the bearing. Thereafter, the surface of the hole in the connecting rod, which is formed of steel, is nickel plated to provide a plating thickness of approximately 0.003 inch. The connecting rod is now inserted into the housing 80 as previously described and the interior surface of the hole in its big end is heated by induction heating to a temperature of approximately 1000° F. as previously described.

In the mean time, a sleeve 136 of bearing material is assembled between the support portion 132 of the support 130 and the applicator tool 124, and this structure is maintained by the ram in elevated position above the anvil 120. The aluminum alloy sleeve or shell at this time is at room temperature. After the surface at the hole in the connecting rod has been heated as described above, and advanced into position on the anvil 120, the ram 122 is lowered to bring the flanged bearing sleeve 136 into position in the hole in the connecting rod where it is supported for a brief interval to permit it to approach the temperature of the hole surfaces of the connecting rod. This will have the effect of expanding the sleeve into tight initial contact with the internal surface of the hole. Thereafter, the ram is advanced to move the applicator tool 124 completely through the hole, elongating the sleeve of bearing material, reducing its thickness, and causing a flow of the metal which exposes fresh unoxidized bearing material directly at the surface to which it is to be bonded.

In a particular example, the parts are designed to applying bearing material to an internal cylindrical surface having a diameter of approximately 4.000 inches. The bearing sleeve is formed of stock having an approximate thickness of 0.065 inch and is initially dimensioned to have its lower end seated on the shallow shoulder 134, the maximum diameter of which is about 3.970 inches. The width of the shoulder is approximately 0.040 inch so that the outer surface of the sleeve extends approximately 0.025 inch radially outwardly of the supporting shoulder. The applicator tool 124 has its lower portion formed to an arcuate cross-section having a radius of approximately 1 inch so located as to cause the arcuate surface 128 to blend smoothly into the cylindrical surface 126. The cylindrical surface 126 has a diameter of about 3.980 inches. The thickness of the bearing material can of course be controlled by the dimensions of the cylindrical portion of the applicator tool with reference to the internal diameter of the hole in the connecting rod.

What we claim as our invention is:

1. Apparatus for applying bearing material to a cylindrical opening in a body and producing a metallurgical bond between the body and the bearing material which comprises a substantially sealed housing, an induction heater in said housing, a support within said housing for said body, means for relatively moving said support and heater to cause said heater to enter the cylindrical opening in said body to heat the surface of the opening, a tubular anvil associated with said housing, means for advancing the body to overlie said anvil with its opening in alignment with the opening in said tubular anvil, a ram having a portion movable toward and away from said anvil, a circular tool connected to said ram for movement therewith and dimensioned to move through the opening in the body with a clearance which determines the thickness of the bearing material deposited on and bonded to the inner surface thereof, said tool having a tapered leading edge effective to apply radial pressure to a sleeve of bearing material within said opening to spread and bond the bearing material to the surface of the opening.

2. Apparatus as defined in claim 1, comprising support means for supporting the sleeve of bearing material ahead of said tool to insert the sleeve in the opening in said body as said tool approaches said body.

3. Apparatus as defined in claim 1, comprising connecting means for detachably securing said tool to the end of said ram adjacent the body to provide for separation of said tool from said ram after said ram has forced said tool completely through the body.

4. Apparatus as defined in claim 3, said connecting means comprising a trigger carried by said ram, and means associated with said ram for releasing said trigger accessible from the exterior of said housing when said tool has moved completely through the opening in said body.

5. Apparatus as defined in claim 4 in which said trigger is pivoted within a longitudinally extending recess in said ram and includes a head movable into and out of retaining position with respect to said tool.

6. Apparatus as defined in claim 2, comprising connecting means for detachably securing said support means and said tool to the end of said ram adjacent the body to provide for separation thereof from said ram after movement thereof completely through the body.

7. Apparatus as defined in claim 1 in which the tapered leading end of said tool is of convexly curved cross-section terminating in an annular surface substantially tangent to a cylinder concentric with said tool.

8. Apparatus as defined in claim 1 in which said tool has a cylindrical portion and in which its tapered leading end is of convexly curved cross-section and merges into tangency with said cylindrical portion.

9. Apparatus for applying bearing material to a cylindrical opening in a body and producing a metallurgical bond between the body and the bearing material which comprises a ram, a circular tool having a tapered leading end, and quick-detachable connecting means for securing said tool to said ram, said tool having a central opening therethrough, said connecting means comprising a trigger movably carried by said ram and including a portion extending through the opening in said tool and movable between tool retaining and tool release positions.

10. Apparatus as defined in claim 9, said trigger being pivotally mounted within a recess in the end of said ram, said ram having a laterally extending opening communicating with said recess and accessible when said ram has moved said tool through the body.

11. Apparatus as defined in claim 9 in which the tapered end of said tool is of convexly curved cross-section terminating in an annular surface substantially tangent to a cylinder concentric with said tool.

12. Apparatus as defined in claim 9 in which said tool has a cylindrical portion and in which its tapered leading end is of convexly curved cross-section and merges into tangency with said cylindrical portion.

13. Apparatus for applying bearing material to a cylindrical opening in a body and producing a metallurgical bond between the body and the bearing material which comprises a ram, a circular tool having a tapered leading end, a sleeve support member, trigger actuated connecting means detachably securing said tool and support member to said ram with a sleeve of bearing material between said member and said tool.

14. Apparatus as defined in claim 13 in which the tapered end of said tool is of convexly curved cross-section terminating in an annular surface substantially tangent to a cylinder concentric with said tool.

15. Apparatus as defined in claim 13 in which said tool has a cylindrical portion and in which its tapered leading end is of convexly curved cross-section and merges into tangency with said cylindrical portion.

16. Apparatus as defined in claim 13, said tool and support member having aligned openings, said connecting means comprising a trigger movably connected to said ram and having a portion extending through the openings in said tool and member and movable between connecting and release positions.

17. Apparatus as defined in claim 16, said support member having a portion shaped to engage said tool to retain said tool in assembly with said ram.

18. Apparatus for applying bearing material to a cylindrical opening through a body and producing a metallurgical bond between the body and the bearing material which comprises an anvil having an opening therein corresponding in size to the opening through the body, a ram, a tool of circular cross-section having a tapered leading end and dimensioned to be received in its entirety in the opening in said anvil, quick-detachable connecting means for securing said tool to said ram, means for moving said ram toward said anvil to move said tool completely through the cylindrical opening through the body into the opening in said anvil, said quick-detachable connecting means being operable to disconnect said tool from said ram to provide for retraction of said ram for removal of said body from said anvil.

* * * * *